United States Patent

[11] 3,550,903

| [72] | Inventor | Hugo Hauser |
| | | Santa Clara, Calif. |
| [21] | Appl. No. | 649,181 |
| [22] | Filed | June 27, 1967 |
| [45] | Patented | Dec. 29, 1970 |
| [73] | Assignee | Huntington Mechanical Laboratories, Inc. |
| | | Mountain View, Calif. |
| | | a corporation of California |

[54] VALVE AND VALVE CLOSURE MECHANISM
8 Claims, 8 Drawing Figs.

[52] U.S. Cl................................................ 251/158,
251/265, 251/333, 251/334, 251/333; 192/54
[51] Int. Cl....................................................F16k 31/524
[50] Field of Search......................................... 251/164,
163, 162, 158, 334, 265, 229, 133, 134, 135, 136,
335.2; 192/48.1, 54, 55, 56

[56] References Cited
UNITED STATES PATENTS

| 2,800,804 | 7/1957 | Olschwang................ | 251/265X |
| 2,912,087 | 11/1959 | Kron........................... | 251/134X |
| 661,712 | 11/1900 | Cederstrom................ | 251/164X |
| 2,238,385 | 4/1941 | Foster......................... | 251/164X |
| 2,459,682 | 1/1949 | Carrie......................... | 251/163X |
| 2,889,133 | 6/1959 | Blomstran................... | 251/164 |
| 3,108,780 | 10/1963 | Wishart....................... | 251/334 |
| 3,164,364 | 1/1965 | McColl........................ | 251/334 |
| 3,174,718 | 3/1965 | Bowen......................... | 251/334 |
| 3,185,438 | 5/1965 | Smirra........................ | 251/334 |
| 3,384,107 | 5/1968 | Kuskevics................... | 251/334X |

*Primary Examiner*—Clarence R. Gordon
*Attorney*—Gregg and Hendricson

ABSTRACT: The valve of this invention comprises a valve body having inlet and outlet fluid flow passages. A valve operator is provided for movement of a valve member between valve open and valve closed positions. The valve operator includes means for rapid opening and closing movement of the valve member over most of the closing and opening operations and a low torque, high mechanical advantage drive for developing large forces near the valve closed position.

INVENTOR.
HUGO HAUSER

INVENTOR.
HUGO HAUSER

INVENTOR.
HUGO HAUSER

BY Gregg & Stidham

ATTORNEYS

3,550,903

VALVE AND VALVE CLOSURE MECHANISM

This invention relates to a valve, and more particularly to a combination valve and valve operator which is particularly well suited for use in a vacuum system.

Lubricants for use in high vacuum systems and at high temperatures often are not reliable. Without lubricants, valves which operate with sliding friction are subject to considerable wear and damage in normal operation. Consequently, valves which open and close with a minimum of abrasive action are desired for such use. Also, resilient seal members undergo sublimation in a high vacuum and for this reason often are not employed in vacuum valves. As a result, high vacuum and/or high temperature valves are often provided with metallic seal members to avoid the problems encountered with elastomer seals.

With metal seals relatively high closing forces which are of sufficient magnitude to deform the metal parts are required, and it is desirable to provide such forces with a minimum torque. However, valve operators which provide a large closing force with a minimum torque input often must be rotated a large number of turns between open and closed positions.

An object of this invention is the provision of a valve and valve operator for vacuum use which may be closed in tightly sealed position by application of a relatively low closing torque.

An object of this invention is the provision of a valve operator which has a fast drive over most of its operating range and a low torque drive capable of developing large forces near the valve closed position during both the valve closing and valve opening operations.

An object of this invention is the provision of a novel valve seat which does not require accurate alignment with a metallic valve closure member to provide a fluid tight seal therebetween.

An object of this invention is the provision of valve seat which is adapted to coact with either a resilient seal member carried by a valve closure member, or with a metallic valve closure member.

An object of this invention is the provision of a novel indicating means for indicating the closed condition of a valve.

The above and other objects and advantages are achieved by use of a threaded valve stem to which the valve closure member is attached. The stem threadedly engages a tapped central aperture of a drive plate, which plate is releasably locked against rotation by a releasable locking means. With the drive plate locked against rotation, the drive shaft is rapidly moved axially upon rotation thereof. During the valve closing operation, near the closed valve position, the stem is locked to the drive plate for rotation of the drive plate by the stem. When the drive plate is rotated, it is moved axially, a short distance for final closing of the valve with a large closing force.

An overrunning clutch is provided between the stem and drive plate for interengagement during initial opening of the valve for return of the drive plate to the releasably locked position, at which point the clutch is disengaged for fast opening of the valve. The position of a rotatable retainer ring for the clutch elements provides an indication of the valve closed condition.

The novel valve seat is provided with a flat surface which is adapted for coacting with a resilient seal ring carried by a valve closure member, and a curved surface in the form of a segment of a sphere for coacting with a metallic valve closure member. With this construction, the same valve body and valve seat may be used in either a bakeable or nonbakeable system simply by changing the drive mechanism and attach valve closure member.

The above and other objects and advantages of the invention will become apparent from the following description when read in conjunction with the accompanying drawings. In the drawings, wherein like reference characters refer to the same parts in the several views.

Figure 1:
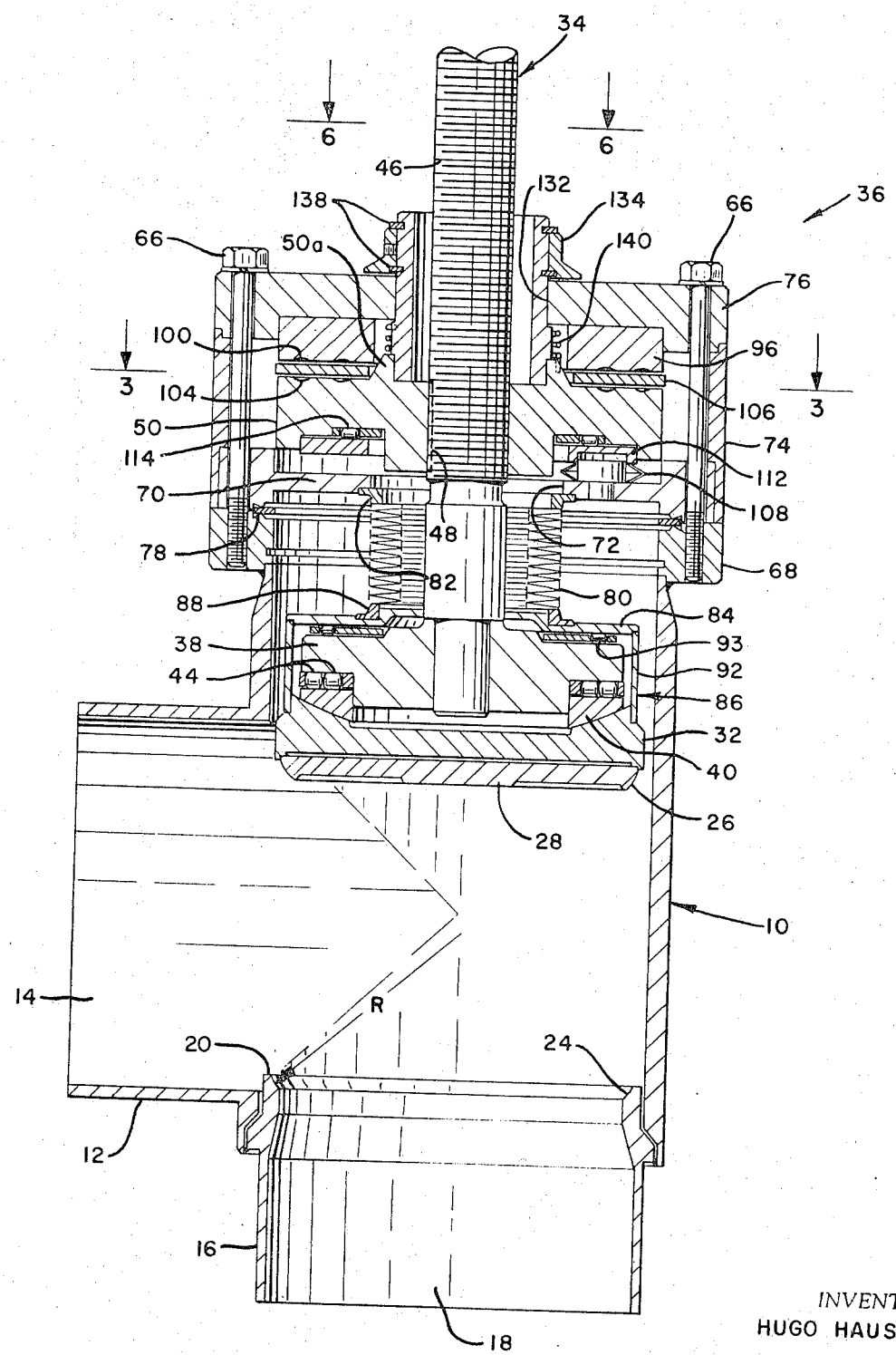
FIG. 1 is a longitudinal cross-sectional view of a valve embodying this invention, and showing the valve in an open condition.
Figure 2:
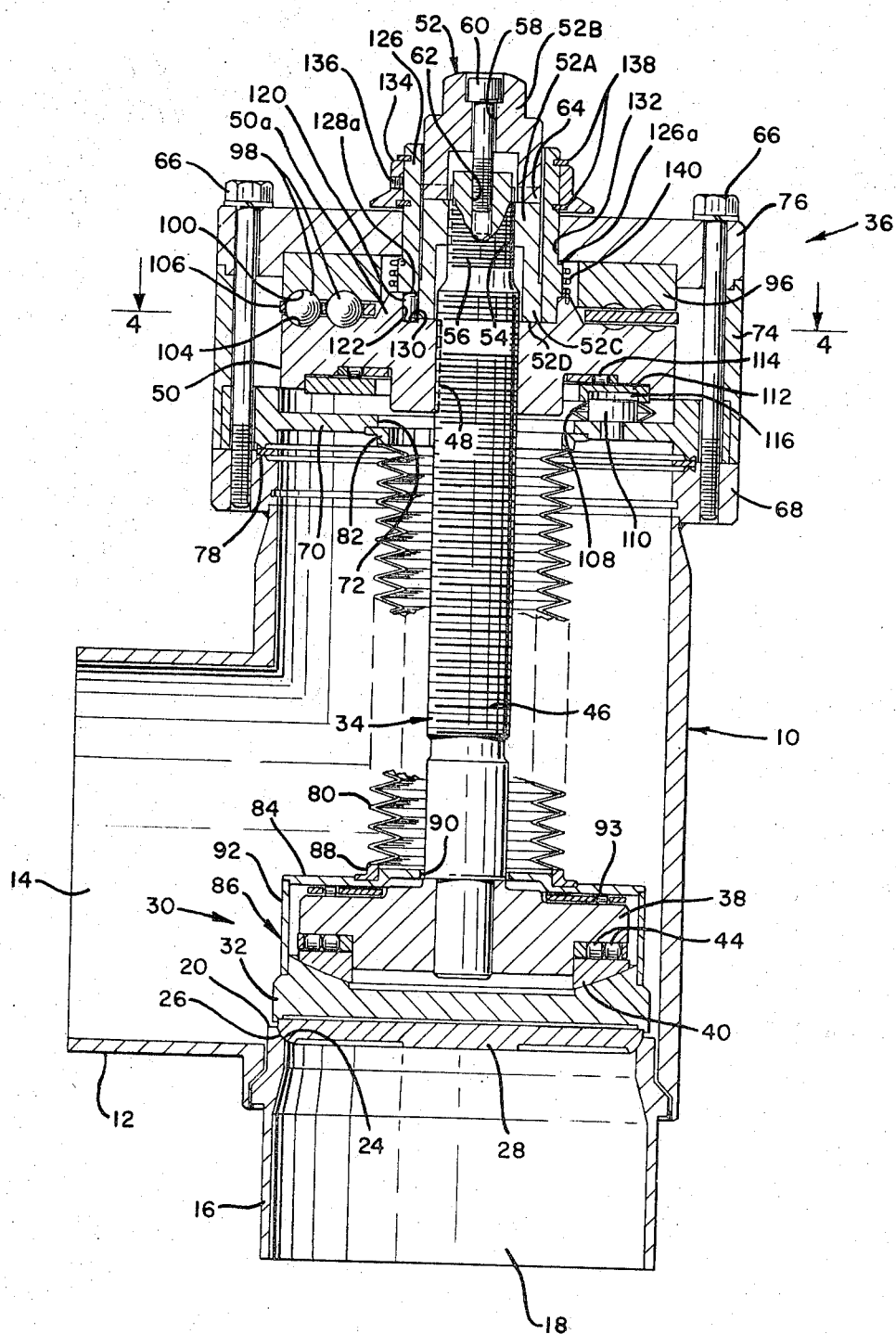
FIG. 2 is a view which is similar to FIG. 1 but showing the valve in the closed condition.

Referring to FIGS. 1 and 2, the valve of this invention comprises a generally cylindrical shaped valve body 10 with ducts 12 and 16 at an opening in the side of the body and at one end of the body, respectively. The duct 12 forms a flow passage 14 which is adapted for connection to a chamber to be evacuated (not shown), and the duct 16 forms a flow passage 18 which is adapted for connection to a vacuum source (not shown). Embracing the flow passage 18 is a novel combination valve seating surface comprising a smooth flat surface 20 (for engagement with a s resilient seal ring 22 shown in FIG. 7, when the valve closing member includes such a resilient seal ring) and a rounded surface 24 which coacts with the curved edge 26 of a valve closure disc 28 to seal off the flow passage 18 in the closed position shown in FIG. 2.

Figure 5:
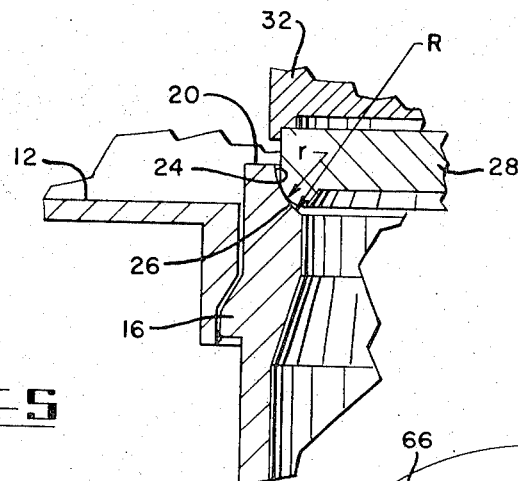
FIG. 5 is an enlarged fragmentary sectional view of the metallic valve seat and valve member seated thereon.

In accordance with one feature of this invention the seating surface 24 comprises a segment of a spherical surface. The spherical segment has a radius R, shown in FIGS. 1 and 5, the center of which is located at a point along the longitudinal axis of the body axially spaced from the seating surface. The curved surface 26 on the valve closure disc 28 is formed with a smaller radius designated r in FIG. 5. By using a spherical seating surface 24 the closure disc surface 26 seats thereon even if the valve closure disc 28 is not in axial alignment with the valve seat axis when the valve is being closed.

The valve closure disc 28 is carried by a disc carrier designated 30 comprising a circular plate 32 to which the closure disc 28 is attached as by a press fit in a recess in the face of the plate. The plate 32 is supported at the inner end of a rotatable valve stem 34 which is axially movable by the novel valve operator identified generally by the reference number 36 and described in detail below.

A thrust bearing plate 38 is fixed to the reduced diameter end of the valve stem 34 by means not shown shown, and abuts a shoulder on the stem. A thrust ring 40 is carried at the forward end of the bearing plate 38 and engages the plate 32 for transfer of a valve closing force from the bearing plate 38 to the valve closure disc 28 through the ring 40 and plate 32. Thrust bearings 44 are located between the bearing plate 38 and ring 40 to insure free rotational movement of the plate 38 with respect to the ring 40.

The valve stem 34 is provided with external threads 46 which engage complementary internal threads 48 on a drive plate 50 included in the valve operator. The drive plate 50 is releasably locked against rotation and axial movement when the valve is in the open position as illustrated in FIG. 1. The stem 34 extends outwardly from the end of the housing of the operator 36, and a two-piece drive nut 52 is attached to the outer end of the stem for rotation by any suitable means such as a wrench, not shown. The drive nut 52 comprises inner and outer sections 52A and 52B, respectively, the inner section 52A of which is in the form of a sleeve having internal threads 54 in engagement with complementary external threads 56 formed on the reduced diameter outer end of the stem 34. The outer section 52B is in the form of a cap nut formed with a hole 58 in the end thereof through which a locking cap screw 60 extends. The screw 60 engages a tapped hole 62 in the end of the valve stem 34, and when the screw 60 is tightened, the outer section 52B is tightly clamped against the inner section 52A to prevent rotation of the drive nut on the stem. The outer end of the inner section 52A and inner end of the cap nut section 52B may be provided with complementary notches as at 64 to assure a locking engagement therebetween. When the locking screw 60 is loosened the drive nut 52 is rotatable relative to the stem 34 for axial adjustment of the drive nut on the stem.

An axial flange 52C is formed at the inner end of the sleeve 52A, the end 52D of which flange is adapted to abut the drive plate 50 in the closed condition of the valve as illustrated in FIG. 2. It will be seen that during the valve closing operation, when the stem 34 is rotated in one direction by use of the drive nut 52 secured thereto, the threads 46 and 48 operate to move the stem downwardly, as viewed in FIGS. 1 and 2, whereby longitudinal linear movement is imparted to the valve closure disc 28. Relatively coarse complementary threads 46 and 48 may be used for fast initial closure of the valve. When the end 52D abuts the drive plate 50 during closure, it will be seen that rotary motion of the valve stem 34 with respect to the drive plate 50 is stopped, and further rotation of the drive nut 52 will produce rotation of the drive plate. Novel low friction means, described below, provide a large closing force for tightly sealing the closure disc 28 against the valve seat 26 with a minimum torque at the drive nut 52.

The valve operator 36 is attached by bolts 66 to a flange 68 secured, as by welding, to one end of the tubular valve body 10. The operator housing comprises an inner transverse wall 70 formed with a central aperture 72 through which the valve stem 34 extends, a large diameter tubular intermediate wall section 74, and an end wall 76, which walls are clamped together and to the flange 68 by the bolts 66. A seal 78 such as a bonnet gasket is disposed between the flange 68 and inner wall 70 to provide a fluid tight engagement therebetween.

To make the valve body fluid tight, a seal is provided between the inner wall 70 and valve stem 34, which seal includes an elongated tubular bellows 80 surrounding the stem 34 and attached at one end to the wall 70 by a connecting flange 82. The other end of the bellows is attached to the end wall 84 of a thrust bearing housing 86 through a connecting flange 88, and an opening 90 is formed in the wall 84 through which the valve stem 34 extends. The housing 86 includes a cylindrical shaped outer wall 92 having one end secured to the plate 32, and the opposite end secured to the end wall 84. Seamless welds may be used at the joints between the above-mentioned elements for fluid tight connections. The bellows 80 expands and contracts with the closing and opening of the valve. To reduce friction engagement between the bearing plate 38 and wall 84 when the valve is open, a thrust bearing 93 may be included therebetween.

Continuing now the description of the valve operator 36, a rear pressure plate 96 is shown positioned at the inner face of the rear wall 76, which plate may be secured to the wall as by welding or other suitable means, not shown. Force transmitting balls 98 are positioned between the pressure plate 96 and drive plate 50 in camming grooves 100 and 104 formed therein, which grooves are described in greater detail hereinbelow. A ball retainer member 106 in the form of an annular plate with ball receiving apertures therethrough maintains the balls in a fixed spaced relationship with each other.

Springs 108 (only one of which is seen in FIGS. 1 and 2) are located at the forward side of the drive plate 50 for resiliently urging the drive plate toward the pressure plate 96 to maintain the seating of the balls in the grooves 100 and 104. The springs 108 which may be of the Belleville type, surround the head of radially spaced guide pins 110 which extend rearwardly from the inner wall 70. A force transmitting ring 112 is carried at the forward face of the drive plate, with a suitable antifriction thrust bearing 114 being provided to insure free rotation of the drive plate 50 relative to the ring 112. The ring is provided with apertures 116 (only one of which is seen in the drawings) into which the head of the pins 110 extend. With this connection, axial movement of the ring together with the plate 50 is permitted, while rotary motion of the ring is prevented. It will be seen that the springs 108 are positioned between the stationary wall 70 and axially movable ring 112 to provide a constant axial force on the drive plate 50 through the ring 112 and thrust bearing 114, to urge the plate 50 toward the rear pressure plate 96.

One of more rows of grooves 100 and 104 may be employed for the force transmitting balls 98, and in the illustrated arrangement two rows of grooves are shown on the drive plate and on the pressure plate, which grooves are arranged along generally concentric circles. The depth of the grooves changes from end to end thereof with one end portion 100a and 104a of the grooves 100 and 104, respectively, being of greater depth than the opposite end portion 100b and 104b (see FIGS. 3 and 4). The grooves, as mentioned above, comprise camming surfaces which coact with the force transmitting balls 98 for urging the drive plate 50 downwardly, as viewed in FIGS. 1 and 2, when the drive plate 50 is rotated from the position shown in FIG. 3 to the position shown in FIG. 4, for travel of the force transmitting balls from the deep to the shallow end of the grooves.

Figure 4:
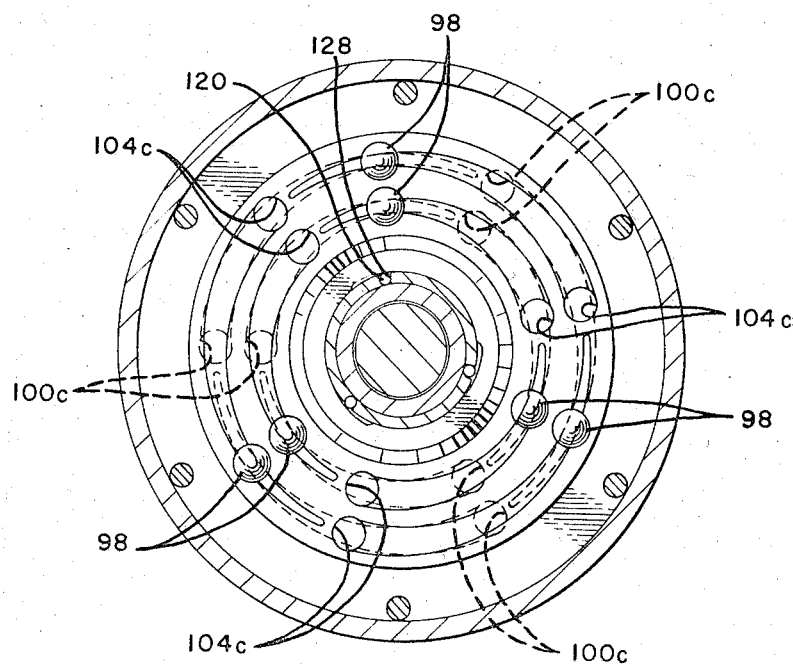
FIG. 4 is a cross-sectional view taken substantially along the line 4-4 of FIG. 2.

As best seen in FIG. 4, enlarged depressions or indentations 100c and 104c are provided at the deep end of the grooves. When the balls 98 are seated in these depressions the drive plate 50 is releasably locked against rotation by action of the spring bias means 108 on the drive plate 50. It will be apparent that releasable detent means which are independent of the camming means could be used, if desired. However, since the force transmitting balls 98 are required for camming action, they are conveniently employed in the releasable detent means. Thus, the balls 98 serve as combination force transmitting and detent locking members in the illustrated arrangement. It also here will be understood that variable depth camming grooves on only one of the drive and pressure plates, but not both, is sufficient to provide the necessary camming action.

Figure 3:
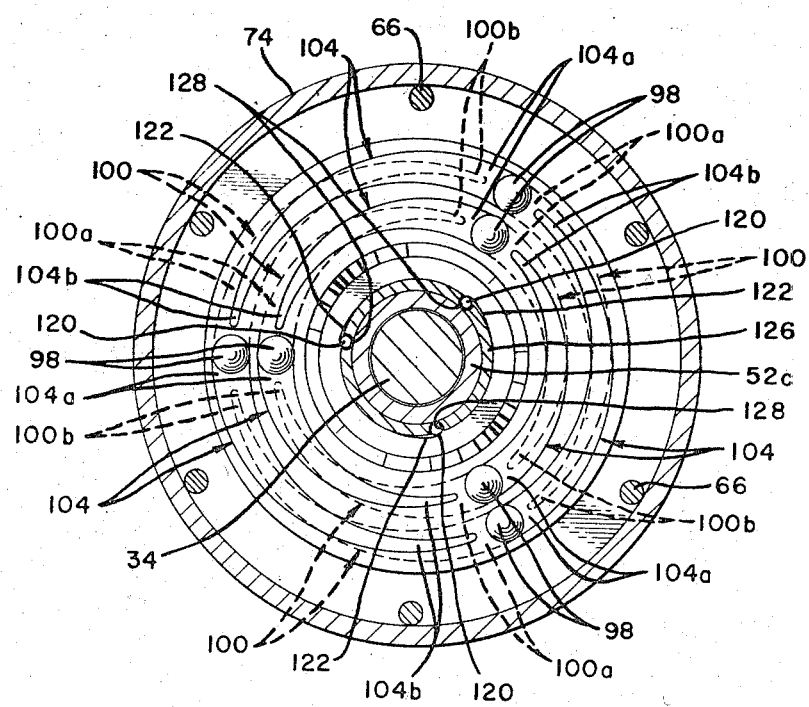
FIG. 3 is a cross-sectional view taken substantially along line 3-3 of FIG. 1.

In the valve open position illustrated in FIGS. 1 and 3, the balls 98 are positioned in the deep indentations 100c and 104c to releasably lock the drive plate 50 against rotation. The drive nut 52 is rotated in a clockwise direction (as viewed from above in FIG. 1) by use of wrench or other suitable means, not shown, for rotation of the valve stem 34 in the stationary plate 50. Because of the threaded connection between the valve stem and drive plate, the valve stem with the attached valve closure member 28 is moved axially toward valve closed condition.

Relative rotary motion of the valve stem and drive plate 50 is permitted until the stop means 52D on the drive nut 52 engages the drive plate 50. This occurs when the valve closure disc 28 is closely spaced from or adjacent the valve seat 24. The stop nut 52 is adjustably positioned along the valve stem (by first loosening the screw 60 as described in detail above) for adjustment of the point at which the stop surface 52D engages the drive plate. By this means the operator is readily adjusted for use with valve closure members of different thickness, and to accommodate changes produced by deformation of the valve closure member with repeated closures. As is common practice in bakeable valves, the valve seat is preferably made of a hard metal such as stainless steel, and the valve closure disc is made of a softer metal, such as copper to permit compression of the same against the valve seat.

When the drive nut end 52D engages the drive plate 50, it will be apparent that the drive plate 50 is rotated upon further rotation of the drive nut and attached valve stem. Upon initial rotation of the drive plate 50, the balls 98 are forced from the depressions 100c and 104c to release the releasable locking means, means. The balls 98 thereupon enter the deep end 100a and 104a of the camming grooves. Upon further rotation the drive plate is driven forward as the force transmitting balls are rolled toward the shallow end of the groove. With this force transmitting arrangement, large closing forces are possible with application of a low torque at the driving nut.

Upon opening the valve, by rotation of the drive nut and attached shaft in the opposite, or counterclockwise direction, (as viewed from above in FIG. 2) it is necessary to rotate the drive plate 50 back to the start or releasably locked position wherein the balls 98 seat in indentations 100c and 104c. For this purpose an overrunning clutch is provided between the drive plate 50 and valve stem, which clutch is engaged during initial opening of the valve. The clutch comprises rollers 120 located in tapered grooves 122 formed on the inside of a hub 50a on the drive plate 50. The rollers are positioned between the hub and the sleeve portion 52C of the drive nut 52 when the valve is in the closed position.

A roller retainer 126 in the form of a sleeve with roller receiving notches 128 (see FIGS. 3 and 4) at the inner end serves to maintain the rollers 120 in the grooves 122. The rollers are maintained in position by the extension of one end thereof into slots 130 formed in the drive plate, and by the abutment of the other end thereof with the bottom 128a of the notches 128 in the retainer 126.

The roller retainer 126 is rotatably mounted in a central aperture 132 formed in the end wall 76. Axial movement of the retainer is limited by a flange 126a thereon which abuts the inner side of the wall 76, and a combination indicator and clutch release ring 134 attached to the retainer ring as by a set screw 136. Stop rings 138 in grooves in the sleeve serve to axially position the ring 134 on the roller retainer, the ring 134, being rotatable on the roller retainer 126 only when the set screw 136 is loosened. A helical spring 140 between the roller retainer 126 and drive plate 50 resiliently rotatably biases the roller retainer with respect to the drive plate to resiliently bias the clutch rollers 120 toward the clutch-engaged condition, i.e., toward the shallow end of the grooves 122.

Figure 6A:
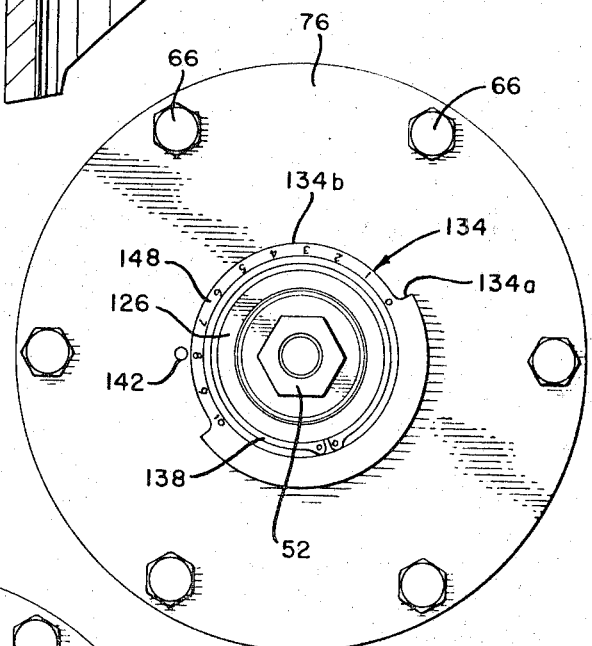
FIG. 6A is an end view of the valve as viewed from the top in FIG. 2 with the indicator showing the valve in the closed condition.
Figure 6:
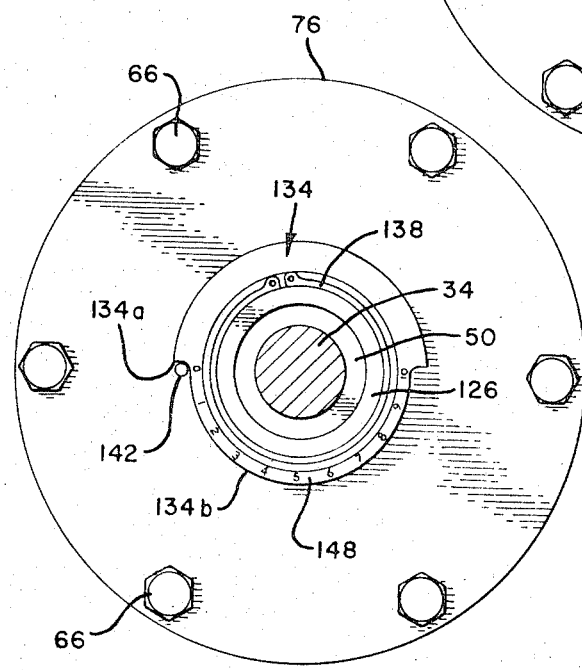
FIG. 6 is a sectional view taken on line 6-6 of FIG. 1 with the valve in the open condition.

During the valve closing operation, the clutch rollers 120 are free to rotate. During initial opening operation from the valve closed condition, the overrunning clutch is engaged (by wedging of the rollers 120 between the drive nut 52 and shallow end of the grooves 122 in the hub 50a ) for rotation of the drive plate 50 back to the start position wherein the balls 98 seat in the indentations 100c and 104c. When the balls are seated during the opening operation, the overrunning clutch is released to permit continued rotation of the drive nut for rotation of the stem 34 within the now releasably locked drive plate 50. The clutch release means includes a pin 42 (see FIGS. 3, 4, 6, and 6A) extending from the rear wall 76 of the operator housing against which an abutment 134a on the ring 134 is adapted to engage when the drive plate is in the releaseably locked position, as seen in FIGS. 3 and 6. A suitable abutment may comprise an end wall of an arcuate cutout portion 134b formed at the perimeter of the ring 134.

The clutch release means operates in the following manner. During the valve opening operation, the axial force on the drive plate provided by the springs 108 is converted to a torque thereon as the balls 98 enter the depressions 100c and 104c. As the balls "snap" into the depressions 100c and 104c the drive plate 50 momentarily is rotated at a faster rate than the drive nut 52, which is rotated by the operator, for overrunning operation of the clutch. Also, at substantially the same time, the abutment 134a on the ring 134 engages the pin 142 to prevent further counterclockwise rotation (as viewed from above in FIGS. 1 and 2) of the clutch roller retainer 126. With the drive plate 50 in the releasably locked position, and the abutment 134a in engagement with the pin 142, the clutch rollers 120 are positioned at the deep end of the grooves 122, in clutch-released position. The valve stem 34 is thereby free for rotation within the releasably locked drive plate upon continued rotation of the drive nut 52 for rapid opening of the valve to the fully opened position upon further rotation of the drive nut 52. Also, with the drive plate 50 in the releasably locked position, the operator is in condition for another closing operation in the manner described above.

The rotary position of the ring 134 provides an indication of the valve open and valve closed conditions, and suitable indicia 148 may be provided on the ring 134 for visual indication of the valve condition. The pin 142 serves as the reference against which the scale 148 is read. As noted above, when the pin engages the abutment 134a, the valve is in an open position. The valve is closed when the ring 134 is rotated clockwise to an up-scale position. The position at which the valve is fully closed may be determined by use of a suitable leak detector, not shown.

Figure 7:
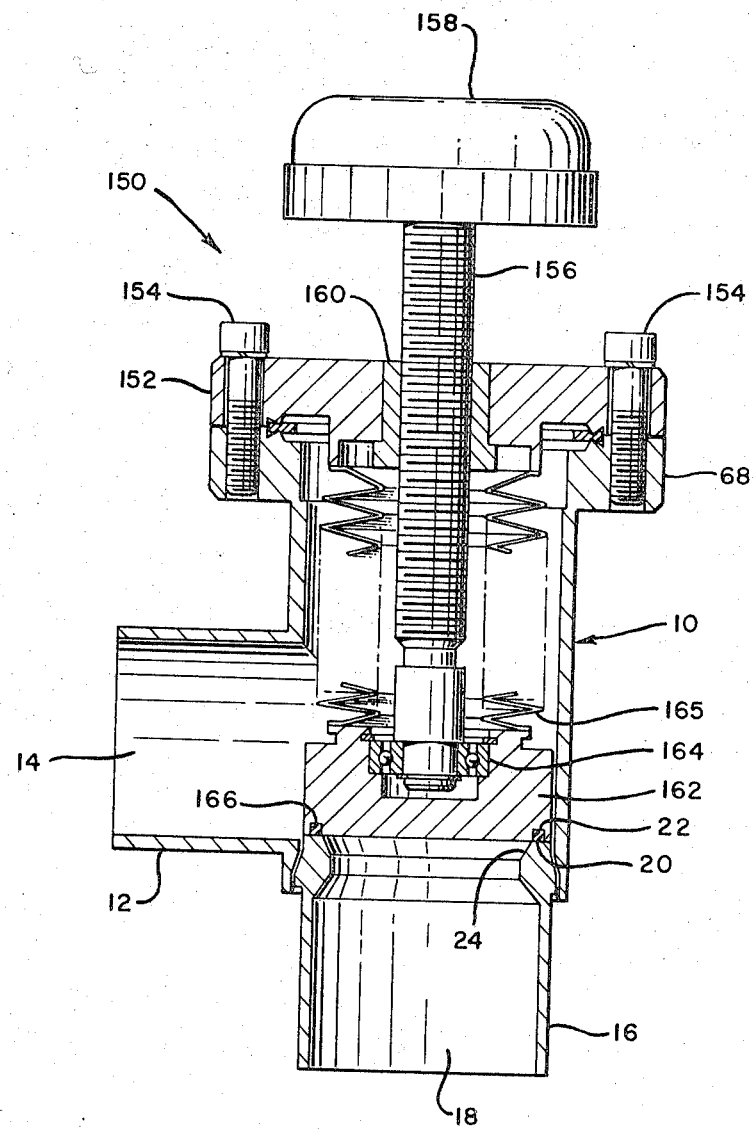
FIG. 7 is a longitudinal sectional view showing a valve with s resilient sealing means, which valve employs the same valve body and valve seat employed in the arrangement shown in FIGS. 1 through 6A.

As described above, the valve operator 36 is readily removed from the valve body 10 by removal of the bolts 66, and may be replaced with a substantially conventional operator designated 150 in FIG. 7. In brief, the operator 150 comprises an end plate 152 adapted to be secured by bolts 154 to the flange 68. A threaded valve stem 156, with a handle 158 at one end, threadedly engages a tapped sleeve 160 carried by the end wall. A valve closure disc 162 is rotatably carried by a bearing 164 at the inner end of the valve stem, and a bellows 165 between the disc and end wall seals the valve body against leakage between the valve stem and bushing 160. An annular groove 166 is formed at the forward end of the valve disc 162 in which the resilient sealing ring 22 is positioned. The valve is closed by rotating the handle 158 in one direction for axial movement of the stem 156 and closure disc to the illustrated valve-closed condition. As described above, with the novel valve seat, the resilient seal ring 22 engages a seat portion 20 which is separate from the seat portion 24 upon which the metal closure disc seats. With this arrangement, contamination of the seat portion 24 by the resilient seal ring is prevented. It will be apparent that the seal ring could be carried in a groove in the face 20 of the valve seat, rather than on he the closure disc 162, if desired. In this case, the seal ring would have to be removed for high temperature, high vacuum, use when the operator 36 and metallic disc 28 is employed.

The invention having been described in detail in accordance with the requirements of the Patent Statutes, various other changes and modifications may occur to those skilled in this art, and it is intended that such changes and modifications shall fall within the spirit and scope of the invention as defined in the appended claims.

I claim:

1. A valve operator for use with a valve having a body with a valve seat, and a valve closure member engageable with said valve seat and movable by the operator between valve open and valve closed positions, said operator comprising:

a housing;

a valve stem rotatably mounted in the housing to which the valve closure member is attached;

means operated in response to rotation of the valve stem to produce axial reciprocal movement of the valve closure member into and out of engagement with the valve seat; and said last-mentioned means including a rotatable drive plate within said housing and through which the valve stem extends in threaded engagement therewith for fast movement of the valve stem during at least most of the portion of said axial movement when the valve closure member is spaced from the valve seat, and a pressure plate and force transmitting members between the drive plate and pressure plate with camming grooves on at least one of said drive and pressure plates engaged by the force transmitting members for axial movement of the drive plate upon rotation thereof for producing a high closure force with a low torque on the valve stem during that portion of said axial movement when the valve closure member is in engagement with the valve seat.

2. The valve operator as defined in claim 1 further characterized by said force transmitting members comprising small metal spheres disposed in said camming grooves and said grooves tapering in depth.

3. A valve operator for use with a valve having a body with a valve seat, and a valve closure member engageable with said valve seat and movable by the operator between valve open and valve closed position, said operator comprising:
- a housing;
- a drive plat rotatably plate rotatably mounted with respect to the housing;
- releasable locking means for releasably locking the drive plate to the housing;
- a rotatable valve stem for movement of the valve closure member;
- complementary means on the valve stem and drive plate to produce axial movement of the valve stem upon rotation thereof when the drive plate is locked by the releasable locking means;
- complementary stop means on the valve stem and drive plate to secure the valve stem and drive plate against relative rotary movement during valve closing operation adjacent the valve closed condition whereby further rotation of the valve stem rotates said drive plate; and
- complementary camming means between the drive plate and housing for axially moving the drive plate during rotation of the drive plate during final closing of the valve for producing a large valve closing force with relatively small torque on the valve stem.

4. The valve operator as defined in claim 3 including, releasable clutch means between the rotatable valve stem and drive plate for engagement during initial valve opening operation for return of the drive plate to the releasably locked condition.

5. The valve operator as defined in claim 4 including, means for releasing the releasable clutch means upon return of the drive plate to the releasably locked condition.

6. The valve operator as defined in claim 4 wherein said releasable clutch means is of the overrunning type which functions in the overrunning manner during valve closing operation during rotation of the valve stem relative to the drive plate.

7. The valve operator as defined in claim 3 including:
- releasable clutch means between the rotatable valve stem and drive plate for engagement during initial valve opening operation for return of the drive plate to the releasably locked condition, said clutch means being of the overrunning type and including clutch rollers;
- a rotatable roller retainer for said clutch rollers;
- means rotatably resiliently biasing the roller retainer for urging the clutch rollers toward clutch engaged position; and
- means for stopping rotation of the roller retainer for release of the overrunning clutch upon return of the drive plate to the releasably locked condition.

8. The valve operator as defined in claim 7 including, means for visually indicating the rotary position of the roller retainer for an indication of the valve closed condition.